United States Patent [19]

Murakami et al.

[11] Patent Number: 5,590,178
[45] Date of Patent: Dec. 31, 1996

[54] ELECTRONIC MAIL SYSTEM LINKED WITH TELEPHONE

[75] Inventors: Masahiko Murakami; Masahiro Matsuda; Noriyuki Fukuyama, all of Kawasaki, Japan

[73] Assignee: Fujitsu Limited, Kanagawa, Japan

[21] Appl. No.: 266,225

[22] Filed: Jun. 27, 1994

[30] Foreign Application Priority Data

Sep. 28, 1993 [JP] Japan .................................. 5-241556

[51] Int. Cl.$^6$ .......................... H04M 11/00; H04M 1/64; H04N 7/14
[52] U.S. Cl. .................. 379/96; 379/88; 379/89; 348/15
[58] Field of Search ................... 379/93, 96, 97, 379/98, 100, 88, 89; 348/15

[56] References Cited

U.S. PATENT DOCUMENTS

| | | | |
|---|---|---|---|
| 4,935,954 | 6/1990 | Thompson et al. | 379/96 |
| 4,943,996 | 7/1990 | Baker, Jr. et al. | 379/96 |
| 4,972,462 | 11/1990 | Shibata | 379/89 |
| 5,299,255 | 3/1994 | Iwaki et al. | 379/96 |

FOREIGN PATENT DOCUMENTS

| | | |
|---|---|---|
| 57-178467 | 11/1982 | Japan . |
| 59-200559 | 11/1984 | Japan . |
| 62-284546 | 12/1987 | Japan . |

*Primary Examiner*—Jason Chan

[57] ABSTRACT

An object of the present invention is to realize an electronic mail system wherein related electronic mail is automatically displayed when a telephone call is placed. The electronic mail system of the invention is constructed by linking an electronic mail system composed of a plurality of terminals and an electronic mail center, with a telephone system composed of a plurality of telephones and a telephone exchange, the telephones being associated in advance with individual users. The electronic mail center is equipped with means for storing a table of correspondence between user IDs and telephone numbers, a terminal interface capable of identifying the users using the terminals, and a status variable management table for managing status variables by which to recognize the mail currently displayed. The telephone exchange notifies the calling and called telephone numbers to the electronic mail center upon the reception of a call request, and the electronic mail center then identifies the user IDs in accordance with the correspondence table and transmits the related electronic mail for display on the terminals of the calling user and called user.

54 Claims, 9 Drawing Sheets

Fig. 4

| USER NAME | TELEPHONE NO. | CALLED PARTY | LOGIN STATUS (LOGIN TERMINAL NAME) | MAIL STATUS |
|---|---|---|---|---|
| mul | 985 | fukuyama | pc01 | none |
| tetsu | 986 | none | not login | none |
| fukuyama | 987 | mul | pc05 | read <9302082037.AA30> |

Fig.6

HEADER

From: Tetsu
To: Mul
Date: Tue, 16 Feb 93 04:35:11 JST
Message-ID: <9302151935.AA22067>
References: <9302082038.AA03689>

TEXT

THIS IS GOTO.
REGARDING THE NEXT MEETING, FOR THE
TIME BEING···

Fig. 8

HEADER:
```
From:         Tetsu
To:           Mul
Date:         Tue, 16 Feb 93 04:35:11 JST
Message-ID:   <9302151935.AA22067>
References:   <9302082038.AA03689>
Free-access:  OK
```

TEXT:
```
THIS IS GOTO.
REGARDING THE NEXT MEETING, FOR THE
TIME BEING...
```

ELECTRONIC MAIL SYSTEM LINKED WITH TELEPHONE

BACKGROUND OF THE INVENTION (1) Field of the Invention

The present invention relates to an electronic mail system, and more particularly to an electronic mail system adapted to operate in an interlinked relationship with a telephone system which has traditionally existed as an independent system separate from an electronic mail system.

(2) Description of the Related Art

Letters, telephones, and facsimile machines have been used as primary means for communicating and exchanging information between persons at distant locations. In recent years, however, with increasing processing capabilities and decreasing prices of computers, computer networking has been developing rapidly, and electronic mail, a kind of computer-based service, has been becoming widespread as a means of exchanging messages between computers. Electronic mail has also found widespread use in offices where groupware, a system designed for efficient communication within a group using computers, has not been introduced. Electronic mail has the advantage that messages can be sent, like letters, at any convenient time without the fear of interfering with the work of the recipient (which is often the case with a telephone call), and unlike letters, can be made instantly available to the recipient. As a result, electronic mail has come to be used even when transmitting the kind of information that traditionally would have been transmitted by letter or telephone.

Information transmitted by electronic mail is visually recognizable information, like a letter, and offers different benefits than when speaking directly or talking over the telephone. However, electronic mail can transmit only information represented by character codes entered from a keyboard, etc., and when it comes to instantaneity, the telephone, which allows direct interactive communication, has an advantage over electronic mail. For example, when there is a need to confirm that the intention of the sender is properly communicated to the receiver, electronic mail requires at least two communications, whereas in the case of a telephone call, the sender can get the reaction from the other party during the conversation.

Therefore, after sending a message by electronic mail, users often make a telephone call and talk about the material transmitted by electronic mail. It should, however, be recalled that one of the advantages of electronic mail is that the recipient can view the contents of electronic mail at his convenience; therefore, when the sender calls the recipient on the phone, it could happen that the recipient has not yet read the message, or even if he has already read the message, he may be working on a different task. In such cases, if the recipient has to answer the phone without knowing the contents of the electronic message, he is unable to respond easily. Furthermore, users who frequently use electronic mail are usually doing their work with their terminals always on. When such a user receives a telephone call about the contents of an electronic message, as described above, he is expected to operate his terminal to recall an electronic mail list and bring the electronic mail in question onto the terminal screen. While the recipient is going through this procedure, he has to keep the caller waiting. Hence, there arises the need to reduce such a waiting time as much as possible.

Conversely, there are cases in which the recipient of an electronic mail message telephones the originator about the contents of the message. In such cases also, the sender of the electronic message who received the call needs to operate his terminal to recall an electronic mail list and bring the electronic mail message in question onto the terminal screen; hence, the need to reduce the time required for such operation as much as possible. When calling the other party on the phone about the contents of an electronic message, whether the caller is the originator or the recipient of the electronic message, the caller is required to recall the electronic message in question for display. For such cases also, there is a need to reduce the time required for such operation as much as possible.

SUMMARY OF THE INVENTION

In view of the above enumerated problems, it is an object of the present invention to realize an easy-to-operate system designed to suit actual use by interlinking independent electronic mail and telephone systems.

The present invention is directed to an electronic mail system linked with a telephone. The electronic mail system is composed of a plurality of terminals connected through a network, and an electronic mail center through which electronic mail is exchanged among users of the terminals; the telephone system linked with the electronic mail system comprises a plurality of telephones and a telephone exchange for connecting the telephones. The electronic mail center is equipped with a terminal interface capable of identifying the users using the terminals, and a status variable managing means for managing status variables by which to recognize the mail each individual user is currently reading. To achieve the above object, the electronic mail system linked with telephone is characterized in that: the telephones are associated in advance with the individual users of the electronic mail system; the electronic mail center is equipped with a correspondence table storing means for storing a table of correspondence between user IDs and telephone numbers as well as electronic mail for each user; the telephone exchange, upon reception or acceptance of a call request, notifies the calling telephone number or the called telephone number or both to the electronic mail center; and the electronic mail center identifies the user ID of the calling user or the called user, or the user IDs of both parties, corresponding to the notified telephone number or numbers by referencing the correspondence table, and transmits, upon connection of the call, an electronic mail message or a list of electronic mail messages associated with the calling user to the login terminal of the calling user, or an electronic mail message or a list of electronic mail messages associated with the called user to the login terminal of the called user, the electronic mail message or the list of electronic mail messages thus transmitted being displayed on the terminal concerned.

Preferably, the electronic mail message or the list of electronic mail messages displayed on the terminal upon calling or upon call acceptance is the electronic mail sent from the calling user to the called user or from the called user to the calling user or the electronic mail exchanged between these two users, and further preferably, the latest one among such mail messages.

According to another preferred mode of the invention, the telephones are associated in advance with the individual terminals connected to the electronic mail system; each of the terminals is capable of detecting a calling action initiated by the attached telephone, the telephone number of the destination, and the acceptance of the call; the electronic mail center is equipped with a correspondence table storing means for storing a table of correspondence between the terminals and the telephones; the terminal to which the originating telephone is attached notifies the calling telephone number and the called telephone number to the electronic mail center upon the initiation of a call or upon the acceptance of the call; and the electronic mail center identifies the user IDs of the calling user and called user corresponding to the notified telephone numbers by referencing the correspondence table, and transmits, upon connection of the call, an electronic mail message or a list of electronic mail messages associated with the calling user and called user to the login terminal of the calling user or called user, the electronic mail message or the list of electronic mail message thus transmitted being displayed on the terminal.

Traditionally, an electronic mail system and telephone system are respectively independent entities, and there are no corresponding relationships between the telephones and the terminals on which electronic mail is displayed. Such being the case, it has not been possible to link the display action of electronic mail with communication by telephone. On the other hand, according to the system of the present invention, the telephones are associated in advance either with the users of the electronic mail system or with the terminals connected to the electronic mail system, and their corresponding relationships are stored in the electronic mail center; therefore, with the originating telephone number or the destination telephone number notified from the telephone exchange or the terminal, the electronic mail center can transmit related electronic mail or a list of related electronic mail for display on the terminal corresponding to the originating telephone number or destination telephone number.

This improves the operability of the system since related electronic mail or a list of related electronic mail is automatically displayed without going through complex operating procedures when the user initiates communication by telephone concerning electronic mail.

BRIEF DESCRIPTION OF THE DRAWINGS The present invention will be more clearly understood from the description as set forth below with reference to the accompanying drawings, wherein:

FIG. 4 is a diagram showing a table constructed by combining a use ID/telephone number correspondence table with a user status variable table;

FIG. 6 is a diagram showing an example of electronic mail format;

FIG. 8 is a diagram showing an example of electronic mail format according to a second embodiment.

DESCRIPTION OF THE PREFERRED EMBODIMENTS

Preferred embodiments of the invention will now be described below. For simplicity of explanation, the following description assumes communication between two persons, user A and user B, but it will be recognized that the operations are basically the same for communication among three or more persons, except for those points that will be described later.

Figure 1:
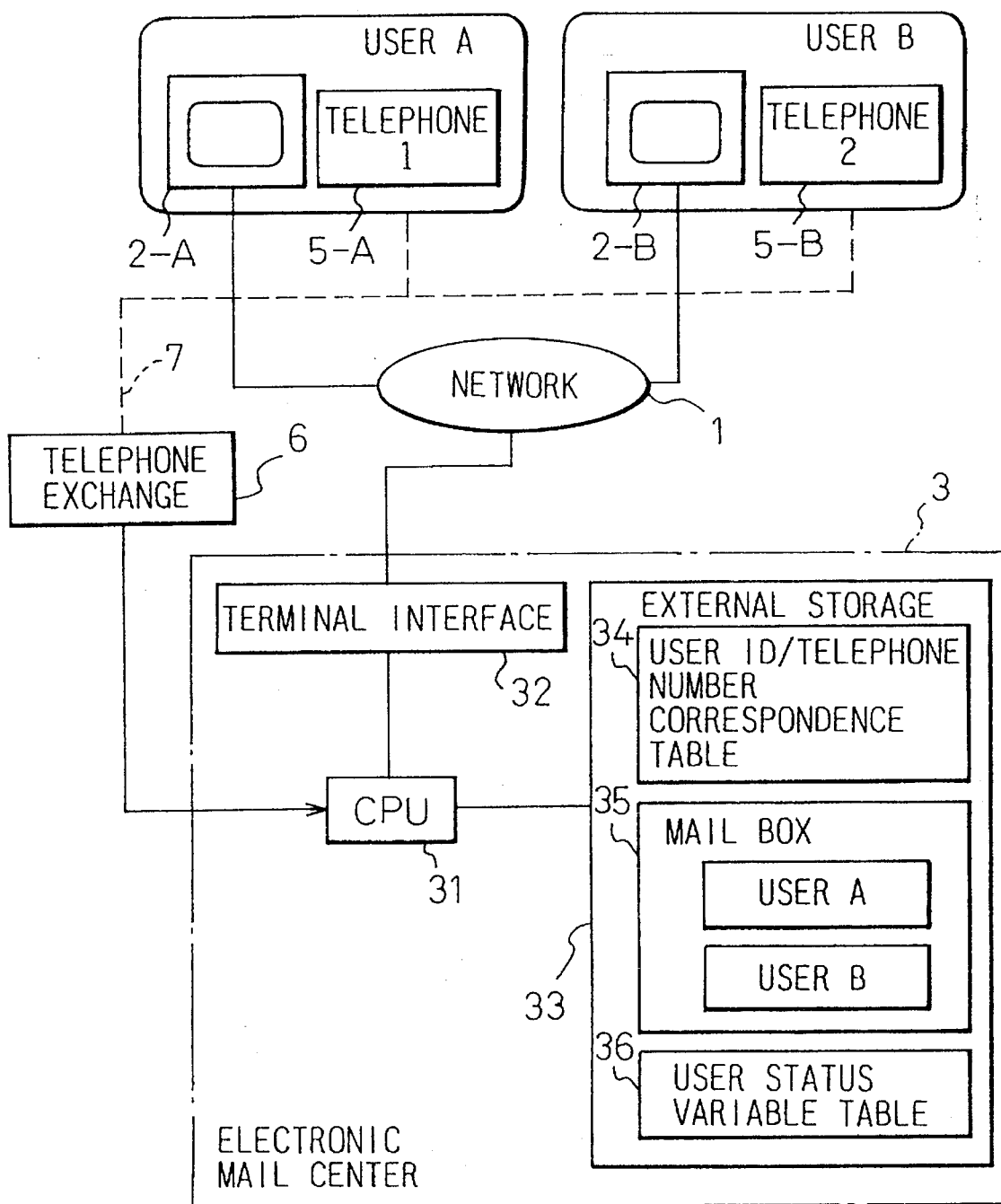
FIG. 1 is a diagram showing the configuration of a first embodiment of the system of the present invention.

FIG. 1 is a diagram showing a system configuration according to a first embodiment.

Figure 2:
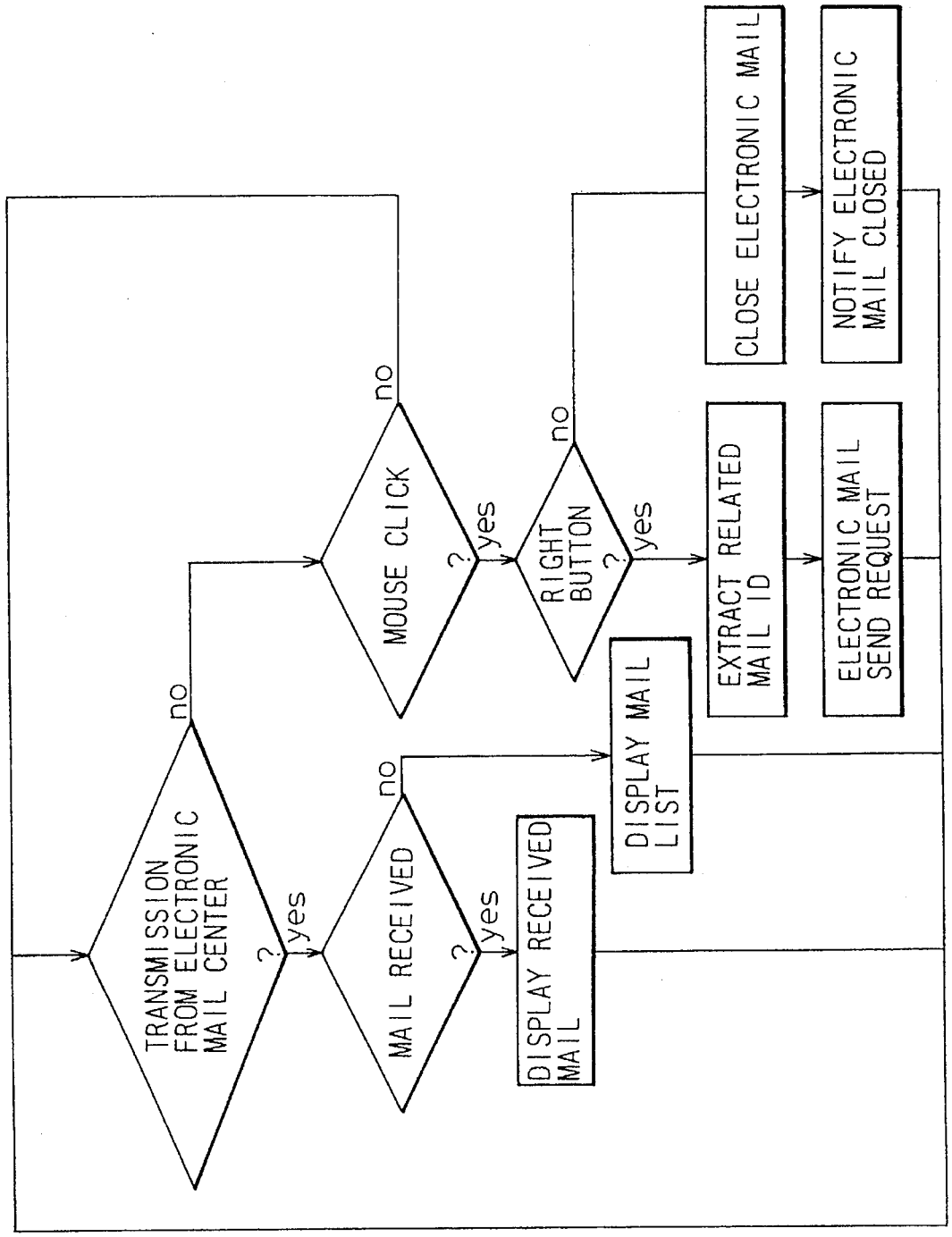
FIG. 2 is a diagram for explaining a sequence of operations when a terminal in the embodiment of FIG. 1 logs in to an electronic mail center.

In the figure, the reference numeral 1 is a network; 2-A and 2-B are terminals which are personal computers; 3 is an electronic mail center; 5-A and 5-B are telephones; 6 is a telephone exchange; and 7 is a telephone line. User A and user B log in to the electronic mail center 3 via the network 1 from their respective terminals 2-A and 2-B. FIG. 2 is a flowchart illustrating the sequence of operations performed in each of the terminals 2-A and 2-B for communication with the electronic mail center 3. Each terminal goes through the operations shown in FIG. 2, to display the electronic mail addressed to the terminal, and so on. The operating procedure shown in FIG. 2 is a well known procedure and does not have a direct bearing on the present invention, and therefore, detailed explanation of the procedure will not be given here. Though not shown in FIG. 1, there are many users other than user A and user B, and many other terminals and telephones are connected to the same system.

Figure 3:
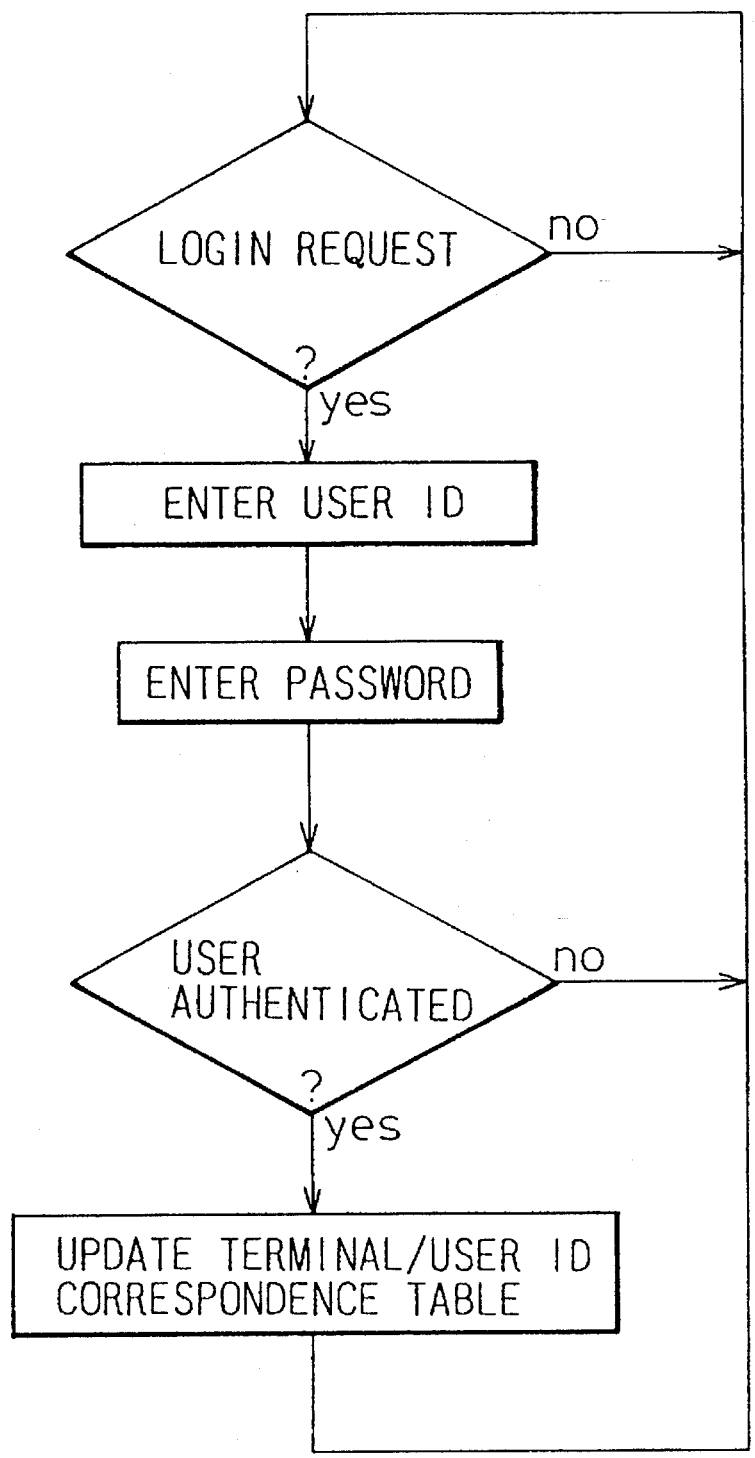
FIG. 3 is a diagram illustrating a procedure for operations between user and terminal at a terminal interface.

The electronic mail center 3 comprises a central processing unit (CPU) 31 responsible for all necessary processing, a terminal interface 32, and an external storage 33. The external storage 33 holds therein a user ID/telephone number correspondence table 34 containing the correspondence between user ID numbers and telephone numbers, a user status variable table 36, and a mailbox 35. In this embodiment, the network 1 is an Ethernet network, and the terminal interface 32 is able to identify, from the MAC address of the Ethernet, which user is logging in from which terminal, as illustrated in FIG. 3.

The telephones 5-A and 5-B are personal portable telephones which are assigned to the respective users. That is, the telephones have a one-to-one correspondence with the individual users. The user ID/telephone number correspondence table 34 stores this telephone/user correspondence; that is, this correspondence is registered with the electronic mail center 3 at the time of user registration, and stored in the user ID/telephone number correspondence table 34.

The portable telephones 5-A and 5-B are connected via radio to the telephone exchange 6 which then connects to the CPU 31 of the electronic mail center 3 and notifies the source and destination numbers.

The user status variable table 36 records a history of user activities performed on electronic mail such as reading and closing electronic mail. By referencing the user status variable table 36, it is possible to know which user is reading which mail message at a particular time, on a user-by-user basis. FIG. 4 is a table constructed by combining the user ID/telephone number correspondence table 34 and the user status variable table 36. As shown, a telephone number is registered for each individual user, and the status shows whether the user has logged in and who is the called party; when the user has logged in, the login terminal and the mail status are updated accordingly. Flags for implementing various additional functions, which will be described later, are realized by adding corresponding entries to this table.

Figure 5:
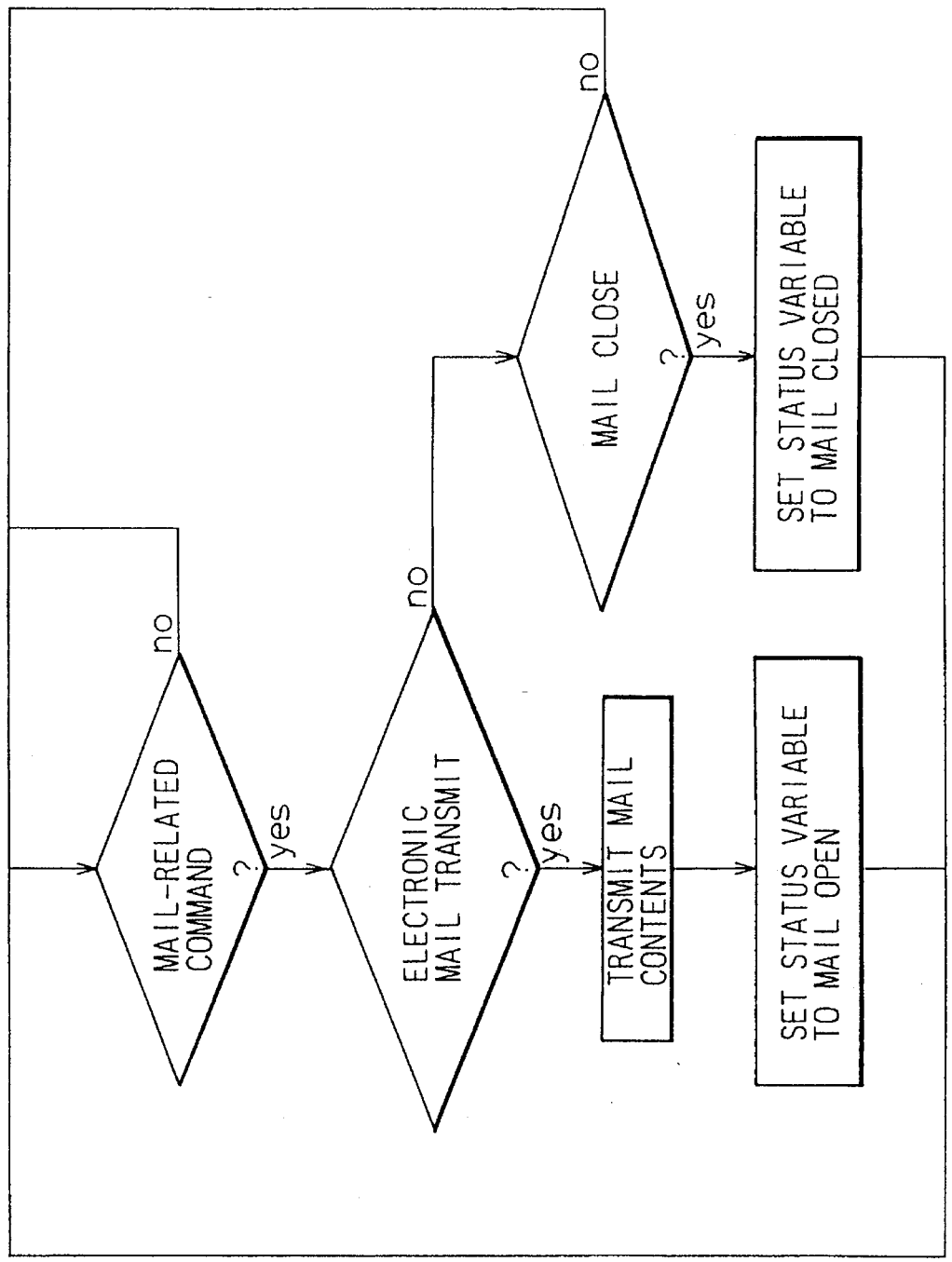
FIG. 5 is a diagram illustrating operations relating to electronic mail and the setting of a status variable.

FIG. 5 is a flowchart illustrating the operations that the user performs on electronic mail and the processing for setting the mail status in the user status variable table 36. The mail status in the user status variable table 36 is set as illustrated, and by examining this mail status, it is possible to know the status of the electronic mail that each user is viewing.

FIG. 6 is a diagram showing an example of electronic mail format. The electronic mail message of this format is made up of a header and a text, the header consisting of a "From" field indicating the originator, a "To" field indicating the addressee, a "Date" field indicating the date, a "Message ID" field indicating the electronic mail ID, and a "Reference ID" indicating the related electronic mail ID.

Figure 7:
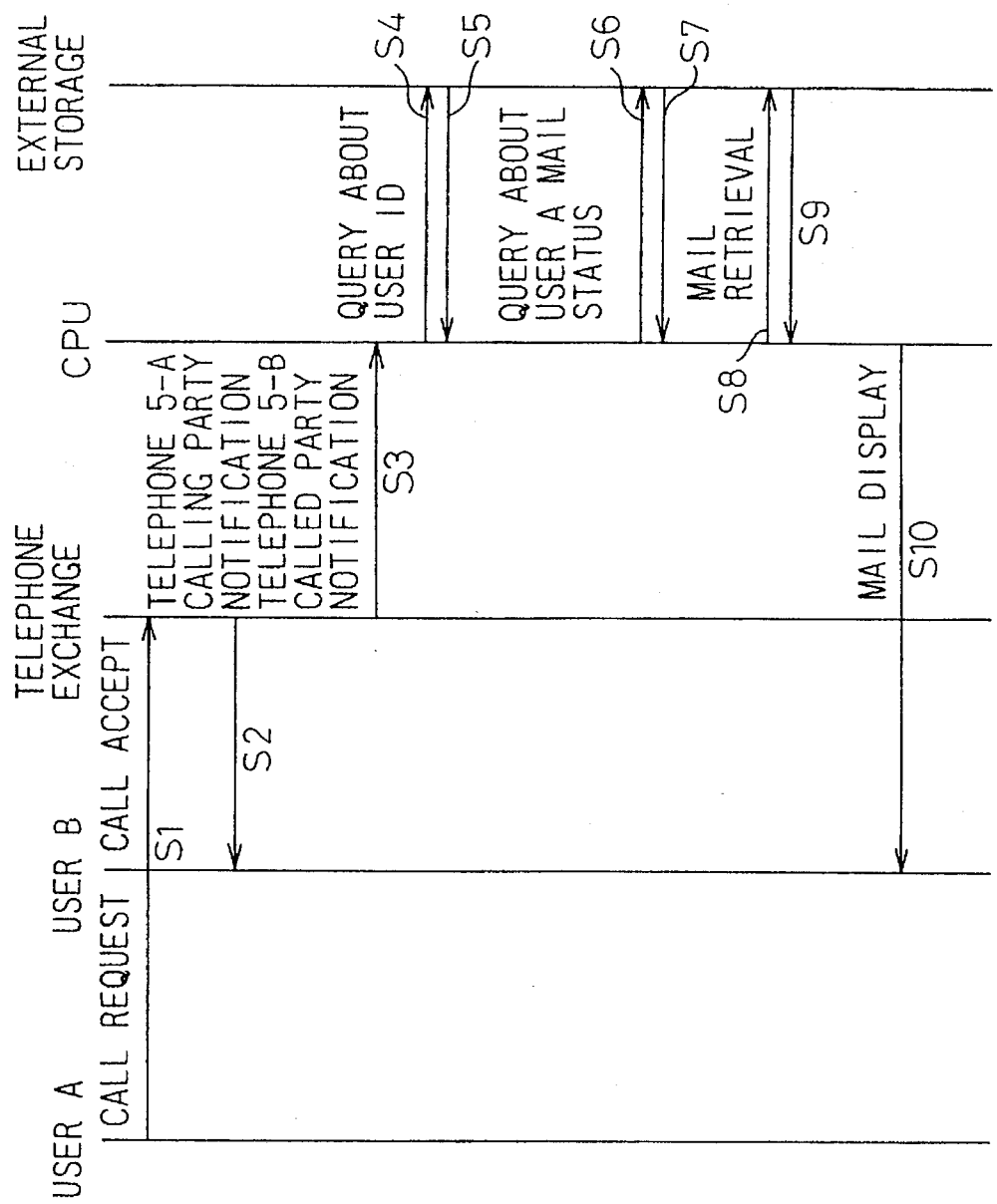
FIG. 7 is a diagram illustrating processing steps according to the first embodiment.

FIG. 7 is a diagram showing the sequence of operations initiated by user A making a phone call from his telephone 5-A to user B's telephone 5-B, according to this embodiment. Explanation will now be given with reference to this figure.

First, in step S1, user A operates his telephone 5-A to make a call to user B's telephone 5-B. The call request from the telephone 5-A for connection to the telephone 5-B is transmitted to the telephone exchange 6. In step S2, the call is switched to the telephone 5-B, and is accepted when the handset of the telephone 5-B is lifted, thus establishing a connection between the telephone 5-A and the telephone 5-B.

Upon establishing the connection, the telephone exchange 6 in step S3 transmits to the CPU 31 the telephone number of the telephone 5-A as calling party notification and the telephone number of the telephone 5-B as called party notification.

In steps S4 and S5, the CPU 31 searches the user ID/telephone number correspondence table 34 in the external storage 33, to verify that the telephone 5-A is the telephone assigned to user A and the telephone 5-B assigned to user B. Thus, the calling party is identified as user A and the called party identified as user B.

In steps S6 and S7, the CPU 31 examines the mail status in the user status variable table 36 stored in the external storage 33, to determine whether user A is logging in from a terminal, and if he is logging in from a terminal, then from which terminal he is logging in, and also determine whether any electronic mail message is displayed on the screen of that terminal and, if so, which electronic mail message is displayed. If user A is not logging in from any terminal, the processing is cancelled since the related electronic mail cannot be displayed.

If user A is logging in from a terminal, for example, from the terminal 2-A, the process then proceeds to steps S8 and S9, where electronic mail associated with user A, e.g. electronic mail sent from user A to user B or electronic mail sent from user B to user A, is retrieved for transmission. If such electronic mail is already displayed on the screen of the terminal 2-A from which user A is logging in, there is no need for mail transmission and the process is terminated. If such electronic mail is not displayed on the screen of the terminal 2-A, then in step S10 the electronic mail is transmitted to the terminal 2-A for display.

The processing procedure according to the first embodiment has been described above. It will be appreciated that various modifications are possible by selecting the kind of information to be displayed, the terminal to display the information, etc. Such modifications will be described below.

First, modifications may be made by selecting the terminal on which to display the related electronic mail, that is, whether the electronic mail is to be displayed on the login terminal of the calling party or on the login terminal of the called party, or on both terminals. It will be desirable to display the electronic mail on both terminals since this will enable the parties at both ends of the line to carry on conversation while viewing the same electronic mail, but displaying the mail only on one or other of the terminals offers an advantage in that the operation to display the electronic mail on the other terminal can be eliminated. When the mail is to be displayed only on the login terminal of the called party, steps S6 to S10 in FIG. 7 are performed for the called party and the login terminal of the called party. When the mail is to be displayed on both terminals, steps S6 to S10 are performed for both users, i.e., the calling party and the called party, and the terminals of both users.

Modifications may also be made by selecting the kind of information to be displayed, that is, an electronic mail message itself or a list of electronic mail messages. When there are more than one related mail message, it is difficult to display multiple mail messages simultaneously; therefore, it is desirable to display a list of electronic mail messages.

The electronic mail message or the list of electronic mail messages to be displayed usually concerns a message or messages sent from user A, the calling party, to user B, the called party, or a message or messages sent from user B to user A, or both of such messages, but there may be other cases where it is desired to talk over the telephone between the two parties while viewing an electronic mail message a third party sent to user A or user B. To retrieve an electronic mail message, the "From" field and "To" field shown in FIG. 6 are examined to find one that matches the proper code. Retrieval of electronic mail is performed by changing the target in steps S8 and S9 in FIG. 7.

When there are more than one electronic mail message that matches, displaying a list of electronic mail messages, as noted above, is one method that can be considered. An alternative way is to display the most recent electronic mail message by searching the "Date" field of the electronic mail shown in FIG. 6. This is because the latest message is the most likely subject to be discussed in the telephone conversation.

When an electronic mail message is already displayed on the terminal at which the calling party is logged in, it is often desirable that the same mail message be displayed on the login terminal of the called party. Accordingly, the electronic mail message displayed on the login terminal of the calling party, user A, is identified, and in steps S8 and S9, the same mail message is retrieved for display on the login terminal of the called party. In this case, however, for security of electronic mail the kind of electronic mail that can be displayed on the login terminal of the called party is limited to the mail originated from or addressed to the called party or to the mail to which a third party is allowed access as will be described later.

Furthermore, there may be cases in which the displayed mail message is not the right one. In such cases, by performing appropriate action such as clicking the right button of a mouse, as in a conventional electronic mail system, a request is sent to the electronic mail center for transmission of a mail message having the message ID shown in the "Reference" field that indicates the related message as shown in FIG. 6. The electronic mail center then retrieves the requested message from the mailbox and transmits it to the terminal originating the send request. On the other hand, when the displayed message is not the message that is needed, the left button of the mouse is clicked, for example, to close the displayed message, and the terminal notifies the electronic mail center accordingly.

It is also desirable that the user be allowed to make a setting, at his option, as to whether the mail should be displayed automatically in accordance with the telephone communication as described above. To implement this function, the user status variable table 36 held in the electronic mail center B is provided with entries for options as to whether the mail should be automatically displayed at the time of making a call and whether the mail should be displayed automatically upon acceptance of a call, enabling the user to make such settings at his option. In steps S6 and S7 in FIG. 7, the contents of these entries are examined, to determine whether the electronic mail concerned should be automatically displayed or not.

Next, a second embodiment of the invention will be described below which uses a telephone system that permits simultaneous communication among three or more parties.

The system configuration of the second embodiment is similar to that illustrated in FIG. 1, except that in the second embodiment the telephone system permits simultaneous communication among three or more parties.

FIG. 8 is a diagram showing an example of electronic mail format according to the second embodiment. As can be seen from the comparison with FIG. 6, a "Free-access" field is added. When this field is included and marked OK, any party other than the calling and called parties is allowed to view the mail message.

The system operation of the second embodiment will be described below by taking a three-party conversation as an example.

For telephone communication among three or more parties, a call is set up between two parties first, and then, either party calls a third party.

When a call is connected to the third party, the user status variable table 36 is referenced to examine whether the first two parties are viewing the same mail message. If the two parties are viewing the same mail message, then the header of that message is examined to see whether the header carries the "Free-access" field and whether that field is marked OK. If it is marked OK, the same message is displayed on the third party's terminal.

If the "Free-access" field is not carried, or if the field is not marked OK, then if the originator of the message is either one of the first two parties, a question "Should the third user be allowed to view this mail message?" is sent to the originator of that message. When the originator sends back an OK instruction in response to the question, then the same mail message is displayed on the login terminal of the third user. Otherwise, the mail message is not displayed on the login terminal of the third user.

Various modifications can be made to the second embodiment, one possible modification concerning a case in which the first two parties are viewing different mail messages. For example, in such a case, neither message may be displayed on the login terminal of the third user, or the mail message displayed on the login terminal of the first caller may be displayed on the login terminal of the third user, or various displays similar to those in the first embodiment may be produced by assuming the relation between the third user and the caller to the third person as that between the two persons in the first embodiment.

The same can be said for cases where the number of parties involved in communication is four, five, or more.

In the first and second embodiments, the telephones have a one-to-one correspondence with individual users, and the calling and called telephone numbers are notified to the CPU of the electronic mail center from the telephone exchange. Alternatively, each telephone may be associated with a particular terminal, and the calling and called telephone numbers may be notified to the CPU of the electronic mail center from the terminal. The third embodiment hereinafter described is concerned with such an example.

Figure 9:
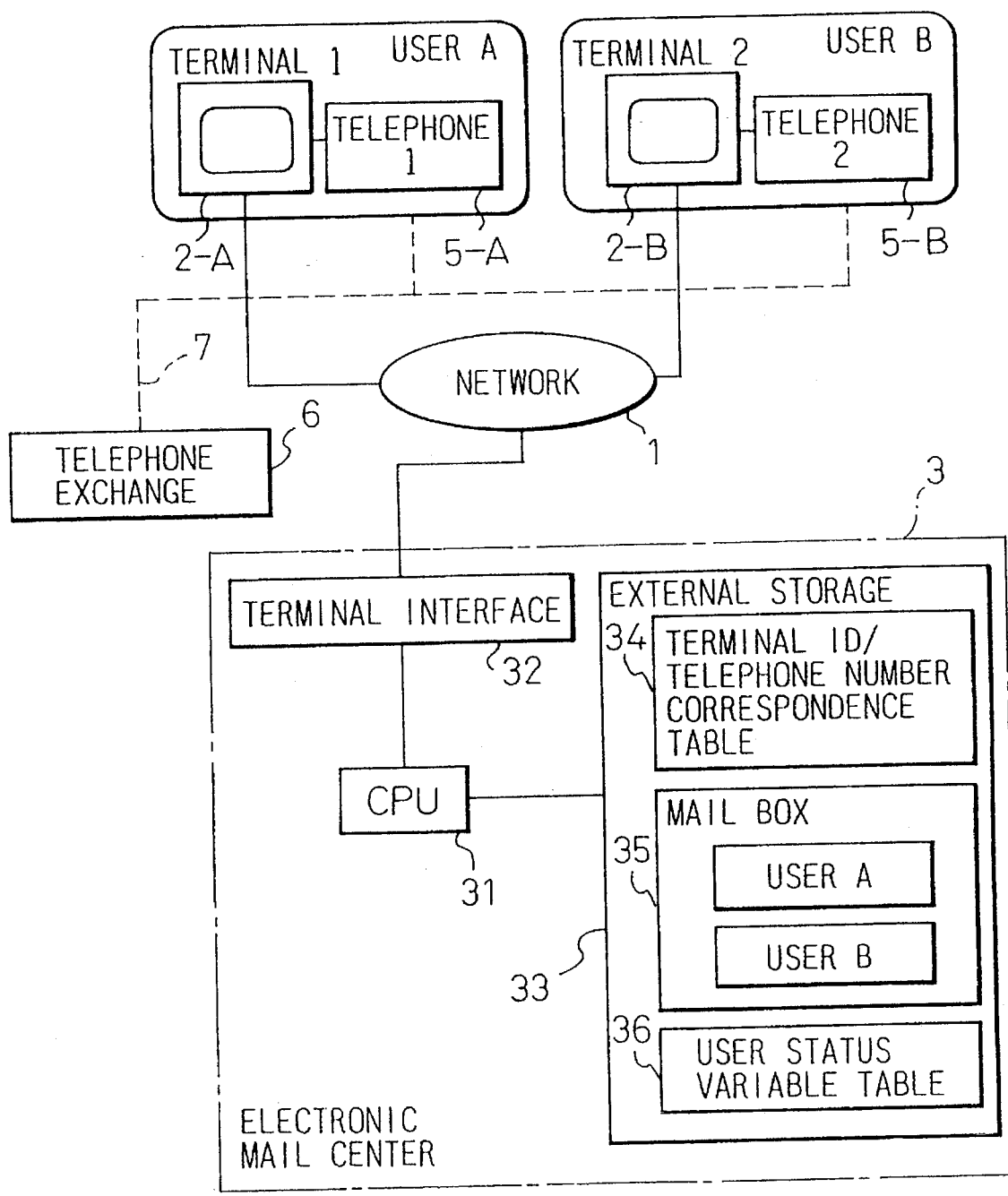
FIG. 9 is a diagram showing the configuration of a third embodiment.

FIG. 9 is a diagram showing the configuration of the third embodiment. In FIG. 9, the components having the same functions as those shown in FIG. 1 are designated by the same reference numerals.

As can be seen, the third embodiment shown in FIG. 9 is similar in configuration to the first embodiment illustrated in FIG. 1, the only difference being that the telephones are associated with individual terminals. In the illustrated example, the terminals 2-A and 2-B are personal computers connectable with telephones, and the telephones 5-A and 5-B notify the respective terminals 2-A and 2-B connected thereto of the initiation of a call, the telephone number of the destination for the call, and the acceptance of the call (lifting of the handset). In other words, the terminals 2-A and 2-B are capable of detecting the actions of the telephones connected to them. In the figure, only two pairs of terminal and telephone are shown, but it will be recognized that many other terminal/telephone pairs are connected to the same system.

The correspondence between the terminal and the telephone connected thereto is registered in advance in the terminal ID/telephone number correspondence table held at the electronic mail center 3. When the user logs in to the electronic mail system from a certain terminal, the telephone attached to the login terminal is then associated with the user.

The operation in the third embodiment will be described below.

First, suppose that user A is using the terminal 2-A to which the telephone 5-A is attached, and that user B is using the terminal 2-B to which the telephone 5-B is attached. In this condition, user A makes a telephone call to user B about a previously sent electronic mail message. At this time, the telephone 5-A notifies the terminal 2-A of the calling telephone number and the called telephone number. In response, the terminal 2-A notifies the calling telephone number and the called telephone number to the electronic mail center 3.

The notified electronic mail center 3 identifies the terminal attached to the called telephone 5-B as 2-B by referencing the terminal ID/telephone number correspondence table. Furthermore, by referencing the user status variable table 36, the user logging in at the terminal 2-A is identified as A and the user logging in at the terminal 2-B is identified as B. This shows that user A logging in at the terminal 2-A is making a call to user B logging in at the terminal 2-B.

When the call arrives at the telephone 5-B and the handset of the telephone is lifted, the acceptance of the call is signalled to the terminal 2-B which then notifies the electronic mail center 3 of the call acceptance, indicating to the electronic mail center 3 that the call has now been set up between user A and user B. Thereafter, the same operations as for the first embodiment will be performed.

As described above, according to the present invention, an easy-to-operate system designed for actual use is realized wherein independent systems of telephone and electronic mail are interlinked so that related electronic mail is automatically displayed when a telephone call is made.

We claim:

1. An electronic mail system linked with a telephone system, comprising:

an electronic mail system composed of a plurality of terminals connected through a network, and an electronic mail center via which electronic mail is exchanged among users of said terminals; and a telephone system composed of a plurality of telephones and a telephone exchange for connecting said telephones, wherein said telephones are associated in advance with individual users of said electronic mail system, said electronic mail center comprises:

correspondence table storing means for storing a table of correspondence between user IDs and telephone numbers as well as electronic mail for individual users;

a terminal interface for identifying the users using said terminals; and status variable managing means for managing status variables by which to recognize the mail each individual user is currently reading, said telephone exchange, upon reception of a call request, notifies the calling telephone number to said electronic mail center, and said electronic mail center identifies the user ID of the calling user corresponding to the notified telephone number by referencing said correspondence table, and transmits, upon connection of the call, electronic mail messages or lists of electronic mail messages associated with the calling user to the login terminal of the calling user, the electronic mail messages or the lists of electronic mail messages thus transmitted being displayed on said login terminal of the calling user.

2. An electronic mail system linked with a telephone system according to claim 1, wherein said telephones are user-exclusive telephones.

3. An electronic mail system linked with a telephone system according to claim 2, wherein said telephones are user-exclusive portable telephones.

4. An electronic mail system linked with a telephone system according to claim 1, wherein said telephones are telephones attached to said terminals, and the telephones attached to the terminals are associated with the users logging in at the respective terminals.

5. An electronic mail system linked with a telephone system according to claim 1, wherein the electronic mail messages or the lists of electronic mail messages that said electronic mail center transmits to the login terminal of the calling user upon reception of a call request, include electronic mail messages or lists of electronic mail messages originating from the calling user and addressed to the called user.

6. An electronic mail system linked with a telephone system according to claim 5, wherein the date of all incoming electronic mail is identifiable, and the electronic mail messages that said electronic mail center transmits to the login terminal of the calling user upon reception of a call request, include the most recent electronic mail message sent from the calling user to the called user.

7. An electronic mail system linked with a telephone system according to claim 1, wherein the electronic mail messages or the lists of electronic mail messages that said electronic mail center transmits to the login terminal of the calling user upon reception of a call request, include electronic mail messages or lists of electronic mail messages originating from the called user and addressed to the calling user.

8. An electronic mail system linked with a telephone system according to claim 7, wherein the date of all incoming electronic mail is identifiable, and the electronic mail messages that said electronic mail center transmits to the login terminal of the calling user upon reception of a call request, include the most recent electronic mail message sent from the called user to the calling user.

9. An electronic mail system linked with a telephone system according to claim 1, wherein the electronic mail messages or the lists of electronic mail messages that said electronic mail center transmits to the login terminal of the calling user upon the reception of a call request, include electronic mail messages or lists of electronic mail messages originating from the calling user and addressed to the called user and electronic mail messages or lists of electronic mail messages originating from the called user and addressed to the calling user.

10. An electronic mail system linked with a telephone system according to claim 9, wherein the date of all incoming electronic mail is identifiable, and the electronic mail messages that said electronic mail center transmits to the login terminal of the calling user upon reception of a call request, include the most recent electronic mail message sent from the calling user to the called user and the most recent electronic mail message sent from the called user to the calling user.

11. An electronic mail system linked with a telephone system according to claim 1, wherein the displayed electronic mail messages or the lists of electronic mail messages can be respectively deleted by depressing a key on the terminal or by clicking a mouse button.

12. An electronic mail system linked with a telephone system according to claim 1, wherein the user can make a setting in advance as to whether electronic mail should be displayed during telephone communication, and any electronic mail that is set to not display will not be transmitted from the electronic mail center to any terminal during telephone communication.

13. An electronic mail system linked with a telephone system according to claim 1, wherein when the displayed mail message contains a key for retrieval of a related electronic mail message, a request for retrieval of the related electronic mail message is sent to the electronic mail center by depressing a key on the terminal or by clicking a mouse button, in response to which the electronic mail center retrieves the requested electronic mail message and transmits the same to the requesting terminal for display thereon.

14. An electronic mail system linked with a telephone system, comprising:

an electronic mail system composed of a plurality of terminals connected through a network, and an electronic mail center via which electronic mail is exchanged among users of said terminals; and a telephone system composed of a plurality of telephones and a telephone exchange for connecting said telephones, wherein said telephones are associated in advance with individual users of said electronic mail system, said electronic mail center comprises:

correspondence table storing means for storing a table of correspondence between user IDs and telephone numbers as well as electronic mail for individual users;

a terminal interface for identifying the users using said terminals; and status variable managing means for managing status variables by which to recognize the mail each individual user is currently reading, said telephone exchange, upon reception of a call request, notifies the called telephone number to said electronic mail center, and said electronic mail center identifies the user ID of the called user corresponding to the notified telephone number by referencing said correspondence table, and transmits, upon connection of the call, electronic mail messages or lists of electronic mail messages associated with the called user to the login terminal of the called user, the electronic mail messages or the lists of electronic mail messages thus transmitted being displayed on said login terminal of the called user.

15. An electronic mail system linked with a telephone system according to claim 14, wherein said telephones are user-exclusive telephones.

16. An electronic mail system linked with a telephone system according to claim 15, wherein said telephones are user-exclusive portable telephones.

17. An electronic mail system linked with a telephone system according to claim 14, wherein said telephones are telephones attached to said terminals, and the telephones attached to the terminals are associated with the users logging in at the respective terminals.

18. An electronic mail system linked with a telephone system according to claim 14, wherein the electronic mail messages or the lists of electronic mail messages that said electronic mail center transmits to the login terminal of the called user upon reception of a call request, include electronic mail messages or lists of electronic mail messages originating from the calling user and addressed to the called user.

19. An electronic mail system linked with a telephone system according to claim 18, wherein the date of all incoming electronic mail is identifiable, and the electronic mail messages that said electronic mail center transmits to the login terminal of the called user upon reception of a call request, include the most recent electronic mail message sent from the calling user to the called user.

20. An electronic mail system linked with a telephone system according to claim 14, wherein the electronic mail messages or the lists of electronic mail messages that said electronic mail center transmits to the login terminal of the called user upon reception of a call request, include electronic mail messages or lists of electronic mail messages originating from the called user and addressed to the calling user.

21. An electronic mail system linked with a telephone system according to claim 20, wherein the date of all incoming electronic mail is identifiable, and the electronic mail messages that said electronic mail center transmits to the login terminal of the called user upon reception of a call request, include the most recent electronic mail message sent from the called user to the calling user.

22. An electronic mail system linked with a telephone system according to claim 14, wherein the electronic mail messages or the lists of electronic mail messages that said electronic mail center transmits to the login terminal of the called user upon the reception of a call request, include electronic mail messages or lists of electronic mail messages originating from the calling user and addressed to the called user and electronic mail messages or lists of electronic mail messages originating from the called user and addressed to the calling user.

23. An electronic mail system linked with a telephone system according to claim 22, wherein the date of all incoming electronic mail is identifiable, and the electronic mail messages that said electronic mail center transmits to the login terminal of the called user upon reception of a call request, include the most recent electronic mail message sent from the calling user to the called user and the most recent electronic mail message sent from the called user to the calling user.

24. An electronic mail system linked with a telephone system according to claim 14, wherein said electronic mail center recognizes the status of electronic mail display at the calling user from the status variable associated with the calling user, and when electronic mail messages originating from the called user are displayed on the login terminal of the calling user, said electronic mail center transmits the same electronic mail messages for display on the login terminal of the called user.

25. An electronic mail system linked with a telephone system according to claim 14, wherein said electronic mail center recognizes the status of electronic mail display at the calling user from the status variable associated with the calling user, and when electronic mail messages originating from the calling user and addressed to the called user are displayed on the login terminal of the calling user, said electronic mail center transmits the same electronic mail messages for display on the login terminal of the called user.

26. An electronic mail system linked with a telephone system according to claim 14, wherein the displayed electronic mail messages or lists of electronic mail messages can be respectively deleted by depressing a key on the terminal or by clicking a mouse button.

27. An electronic mail system linked with a telephone system according to claim 14, wherein the user can make a setting in advance as to whether electronic mail should be displayed during telephone communication, and any electronic mail that is set to not display will not be transmitted from the electronic mail center to any terminal during telephone communication.

28. An electronic mail system linked with a telephone system according to claim 14, wherein when the displayed mail message contains a key for retrieval of a related electronic mail message, a request for retrieval of the related electronic mail message is sent to the electronic mail center by depressing a key on the terminal or by clicking a mouse button and, in response, the electronic mail center retrieves the requested electronic mail message and transmits the same to the requesting terminal for display thereon.

29. An electronic mail system linked with a telephone system, comprising:

an electronic mail system composed of a plurality of terminals connected through a network, and an electronic mail center via which electronic mail is exchanged among users of said terminals; and a telephone system composed of a plurality of telephones and a telephone exchange for connecting said telephones, wherein said telephones are associated in advance with individual users of said electronic mail system, said electronic mail center comprises:

a correspondence table storing means for storing a table of correspondence between user IDs and telephone numbers as well as electronic mail for individual users;

a terminal interface for identifying the users using said terminals; and status variable managing means for managing status variables by which to recognize the mail each individual user is currently reading, said telephone exchange, upon reception of a call request, notifies the calling telephone number and the called telephone number to said electronic mail center, and said electronic mail center identifies the user IDs of the calling user and called user corresponding to the notified telephone numbers by referencing said correspondence table, and transmits, upon connection of the call, electronic mail messages or lists of electronic mail messages associated with the calling user to the login terminal of the calling user, and electronic mail messages or lists of electronic mail messages associated with the called user to the login terminal of the called user, the electronic mail messages or the lists of electronic mail messages thus transmitted being displayed on said respective terminals.

30. An electronic mail system linked with a telephone system according to claim 29, wherein said telephones are user-exclusive telephones.

31. An electronic mail system linked with a telephone system according to claim 30, wherein said telephones are user-exclusive portable telephones.

32. An electronic mail system linked with a telephone system according to claim 29, wherein said telephones are telephones attached to said terminals, and the telephones attached to the terminals are associated with the users logging in at the respective terminals.

33. An electronic mail system linked with a telephone system according to claim 29, wherein the electronic mail messages or the lists of electronic mail messages that said electronic mail center transmits to the login terminal of the calling user upon reception of a call request, include electronic mail messages or lists of electronic mail messages originating from the calling user and addressed to the called user.

34. An electronic mail system linked with a telephone system according to claim 33, wherein the date of all incoming electronic mail is identifiable, and the electronic mail messages that said electronic mail center transmits to the login terminal of the calling user upon reception of a call request, include the most recent electronic mail message sent from the calling user to the called user.

35. An electronic mail system linked with a telephone system according to claim 29, wherein the electronic mail messages or the lists of electronic mail messages that said electronic mail center transmits to the login terminal of the called user upon reception of a call request, include electronic mail messages or lists of electronic mail messages originating from the calling user and addressed to the called user.

36. An electronic mail system linked with a telephone system according to claim 35, wherein the date of all incoming electronic mail is identifiable, and the electronic mail messages that said electronic mail center transmits to the login terminal of the called user upon reception of a call request, include the most recent electronic mail message sent from the calling user to the called user.

37. An electronic mail system linked with a telephone system according to claim 29, wherein the electronic mail messages or the lists of electronic mail messages that said electronic mail center transmits to the login terminal of the calling user upon reception of a call request, include electronic mail messages or lists of electronic mail messages originating from the called user and addressed to the calling user.

38. An electronic mail system linked with a telephone system according to claim 37, wherein the date of all incoming electronic mail is identifiable, and the electronic mail messages that said electronic mail center transmits to the login terminal of the calling user upon reception of a call request, include the most recent electronic mail message sent from the called user to the calling user.

39. An electronic mail system linked with a telephone system according to claim 29, wherein the electronic mail messages or the lists of electronic mail messages that said electronic mail center transmits to the login terminal of the called user upon reception of a call request, include electronic mail messages or lists of electronic mail messages originating from the called user and addressed to the calling user.

40. An electronic mail system linked with a telephone system according to claim 39, wherein the date of all incoming electronic mail is identifiable, and the electronic mail messages that said electronic mail center transmits to the login terminal of the called user upon reception of a call request, include the most recent electronic mail message sent from the called user to the calling user.

41. An electronic mail system linked with a telephone system according to claim 29, wherein the electronic mail messages or the lists of electronic mail messages that said electronic mail center transmits to the login terminal of the calling user upon the reception of a call request, include electronic mail messages or lists of electronic mail messages originating from the calling user and addressed to the called user and electronic mail messages or lists of electronic mail messages originating from the called user and addressed to the calling user.

42. An electronic mail system linked with a telephone system according to claim 41, wherein the date of all incoming electronic mail is identifiable, and the electronic mail messages that said electronic mail center transmits to the login terminal of the calling user upon reception of a call request, include the most recent electronic mail message sent from the calling user to the called user and the most recent electronic mail message sent from the called user to the calling user.

43. An electronic mail system linked with a telephone system according to claim 29, wherein the electronic mail messages or the lists of electronic mail messages that said electronic mail center transmits to the login terminal of the called user upon the reception of a call request, include electronic mail messages or lists of electronic mail messages originating from the calling user and addressed to the called user and an electronic mail messages or lists of electronic mail messages originating from the called user and addressed to the calling user.

44. An electronic mail system linked with a telephone system according to claim 43, wherein the date of all incoming electronic mail is identifiable, and the electronic mail messages that said electronic mail center transmits to the login terminal of the called user upon reception of a call request, include the most recent electronic mail message sent from the calling user to the called user and the most recent electronic mail message sent from the called user to the calling user.

45. An electronic mail system linked with a telephone system according to claim 29, wherein the displayed electronic mail messages or lists of electronic mail messages can be respectively deleted by depressing a key on the terminal or by clicking a mouse button.

46. An electronic mail system linked with a telephone system according to claim 29, wherein the user can make a setting in advance as to whether electronic mail should be displayed during telephone communication, and any electronic mail that is not set to display will not be transmitted from the electronic mail center to any terminal during telephone communication.

47. An electronic mail system linked with a telephone system according to claim 29, wherein when the displayed mail messages contain a key for retrieval of related electronic mail messages, a request for retrieval of the related electronic mail message is sent to the electronic mail center by depressing a key on the terminal or by clicking a mouse button, in response to which the electronic mail center retrieves the requested electronic mail message and transmits the same to the requesting terminal for display thereon.

48. An electronic mail system linked with a telephone system according to claim 29, wherein said telephones are the kind of telephones that permits simultaneous communication between three or more parties, and the electronic mail exchanged between two parties engaged in simultaneous conversation is also displayed, by permission of the originator of said mail, on the login terminals of third parties participating in the same conversation.

49. An electronic mail system linked with a telephone system according to claim 29, wherein said telephones are the kind of telephones that permits simultaneous communication between three or more parties, and the originator of electronic mail can make a setting as to whether free access to the electronic mail should be allowed or not; if the setting is made so that free access is allowed to the electronic mail exchanged between two parties engaged in simultaneous conversation, the same electronic mail is also displayed on the login terminals of third parties participating in the same conversation.

50. An electronic mail system linked with a telephone system, comprising an electronic mail system composed of a plurality of terminals connected through a network, and an electronic mail center via which electronic mail is exchanged among users of said terminals, and a telephone system composed of a plurality of telephones, wherein said telephones are associated in advance with the individual terminals connected to said electronic mail system, each of said terminals is for detecting a call initiated by the associated telephone, the telephone number of the destination, and the acceptance of the call, said electronic mail center is equipped with correspondence table storing means for storing a table of correspondence between said terminals and said telephones, a terminal interface for identifying the users using said terminals, and status variable managing means for managing status variables by which to recognize the mail each individual user is currently reading, the terminal to which the originating telephone is attached notifies the calling telephone number and the called telephone number to said electronic mail center upon initiation of a call, and said electronic mail center identifies the user IDs of the calling user and called user corresponding to the notified telephone numbers by referencing said correspondence table, and transmits, upon connection of the call, electronic mail messages or lists of electronic mail messages associated with the calling user and called user to the login terminal of the calling user, the electronic mail messages or the lists of electronic mail messages thus transmitted being displayed on said login terminal of the called user.

51. An electronic mail system linked with a telephone system, comprising an electronic mail system composed of a plurality of terminals connected through a network, and an electronic mail center via which electronic mail is exchanged among users of said terminals, and a telephone system composed of a plurality of telephones, wherein said telephones are associated in advance with individual users of said electronic mail system, said electronic mail center is equipped with correspondence table storing means for storing a table of correspondence between user IDs and telephone numbers as well as electronic mail for individual users, a terminal interface capable of identifying the users using said terminals, and status variable managing means for managing status variables by which to recognize the mail each individual user is currently reading, and said electronic mail center identifies the user IDs of the calling user and called user corresponding to the notified telephone numbers by referencing said correspondence table, and transmits, upon connection of the call, electronic mail messages or lists of electronic mail messages associated with the calling user and called user to the login terminal of the called user, the electronic mail messages or the lists of electronic mail messages thus transmitted being displayed on said login terminal of the called user.

52. An electronic mail system linked with a telephone system, comprising an electronic mail system composed of a plurality of terminals connected through a network, and an electronic mail center via which electronic mail is exchanged among users of said terminals, and a telephone system composed of a plurality of telephones, wherein said telephones are associated in advance with individual users of said electronic mail system, said electronic mail center is equipped with correspondence table storing means for storing a table of correspondence between user IDs and telephone numbers as well as electronic mail for individual users, a terminal interface capable of identifying the users using said terminals, and status variable managing means for managing status variables by which to recognize the mail each individual user is currently reading, and said electronic mail center identifies the user IDs of the calling user and called user corresponding to the notified telephone numbers by referencing said correspondence table, and transmits, upon connection of the call, electronic mail messages or lists of electronic mail messages associated with the calling user and called user to the login terminals of the calling user and called user, the electronic mail messages or the list of electronic mail messages thus transmitted being displayed on said respective terminals.

53. An electronic mail system linked with a telephone system according to claim 52, wherein said telephones are the kind of telephones that permits simultaneous communication between three or more parties, and the electronic mail exchanged between two parties engaged in simultaneous conversation is also displayed, by permission of the originator of said mail, on the login terminals of third parties participating in the same conversation.

54. An electronic mail system linked with a telephone system according to claim 52, wherein said telephones are the kind of telephones that permit simultaneous communication between three or more parties, and the originator of electronic mail can make a setting as to whether free access to the electronic mail should be allowed or not; if the setting is made so that free access is allowed for the electronic mail exchanged between two parties engaged in simultaneous conversation, the same electronic mail is also displayed on the login terminals of third parties participating in the same conversation.

* * * * *